United States Patent [19]

Lehnard

[11] 4,405,557

[45] Sep. 20, 1983

[54] PROCESS FOR MANUFACTURE OF HOLLOW BODIES FROM SYNTHETIC MATERIALS

[75] Inventor: Jakob Lehnard, Horhausen, Fed. Rep. of Germany

[73] Assignee: Kautex Werke Reinold hagen AG, Bonn-Holzlar, Fed. Rep. of Germany

[21] Appl. No.: 242,071

[22] Filed: Mar. 9, 1981

[30] Foreign Application Priority Data

Mar. 12, 1980 [DE] Fed. Rep. of Germany ....... 3009463

[51] Int. Cl.³ .......................... B29C 17/07; B29D 9/04
[52] U.S. Cl. .................................. 264/515; 264/512; 264/513
[58] Field of Search ............... 264/510, 512, 513, 515, 264/516

[56] References Cited

U.S. PATENT DOCUMENTS

| | | | |
|---|---|---|---|
| 3,900,691 | 8/1975 | Marrs et al. | 264/516 X |
| 4,079,850 | 3/1978 | Suzuki et al. | |
| 4,092,391 | 5/1978 | Valyi | 264/512 |
| 4,254,170 | 3/1981 | Roullet et al. | 264/516 X |

FOREIGN PATENT DOCUMENTS

| | | |
|---|---|---|
| 1950662 | 5/1971 | Fed. Rep. of Germany . |
| 2359447 | 6/1974 | Fed. Rep. of Germany . |
| 2604247 | 9/1976 | Fed. Rep. of Germany . |
| 46-40118 | 11/1971 | Japan .................................. 264/515 |
| 1443170 | 7/1976 | United Kingdom . |
| 2006108 | 5/1979 | United Kingdom . |

*Primary Examiner*—Jan H. Silbaugh
*Attorney, Agent, or Firm*—Seidel, Gonda, Goldhammer & Panitch

[57] ABSTRACT

The conventional process of manufacturing hollow bodies with multi-layer walls using extrusion and blow molding techniques is improved by first making a preform of a thermoplastic carrier layer with an adhesive layer on one or both sides and then applying the additional layer or layers to the adhesive layer(s) in a separate operation. The additional layer(s) has properties different from the carrier layer and serves as an insulation or barrier layer to shield the carrier layer from substances to be contained by or which will surround the hollow body. Among other advantages, the improved process allows recycling of waste and surplus preform material, stronger heat-seal seams in the hollow bodies, less complicated extrusion equipment and more economic use of expensive barrier layer materials.

14 Claims, 10 Drawing Figures

U.S. Patent  Sep. 20, 1983  Sheet 1 of 3  4,405,557
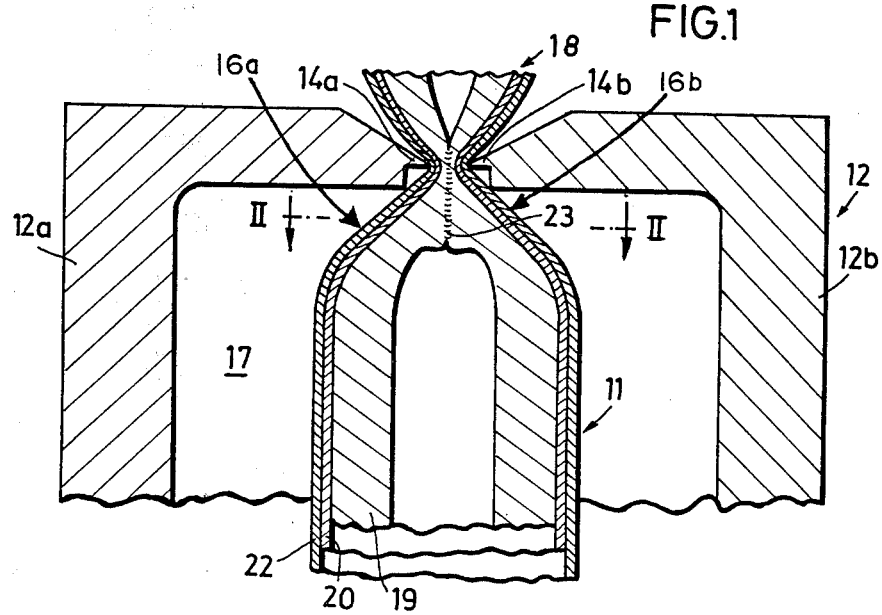
FIG.1
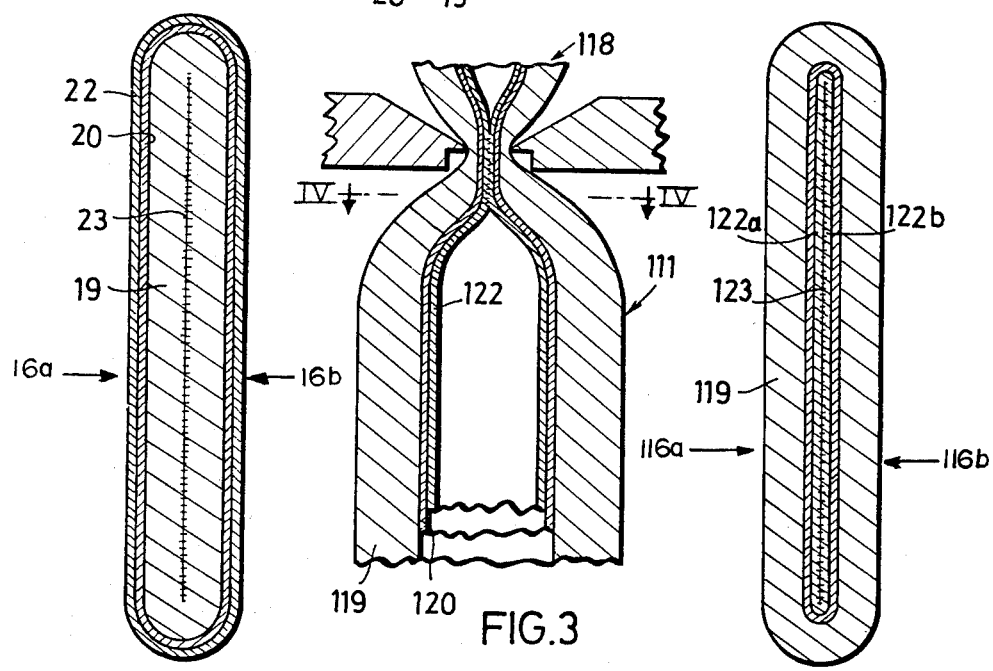
FIG.2
FIG.3
(PRIOR ART)
FIG.4

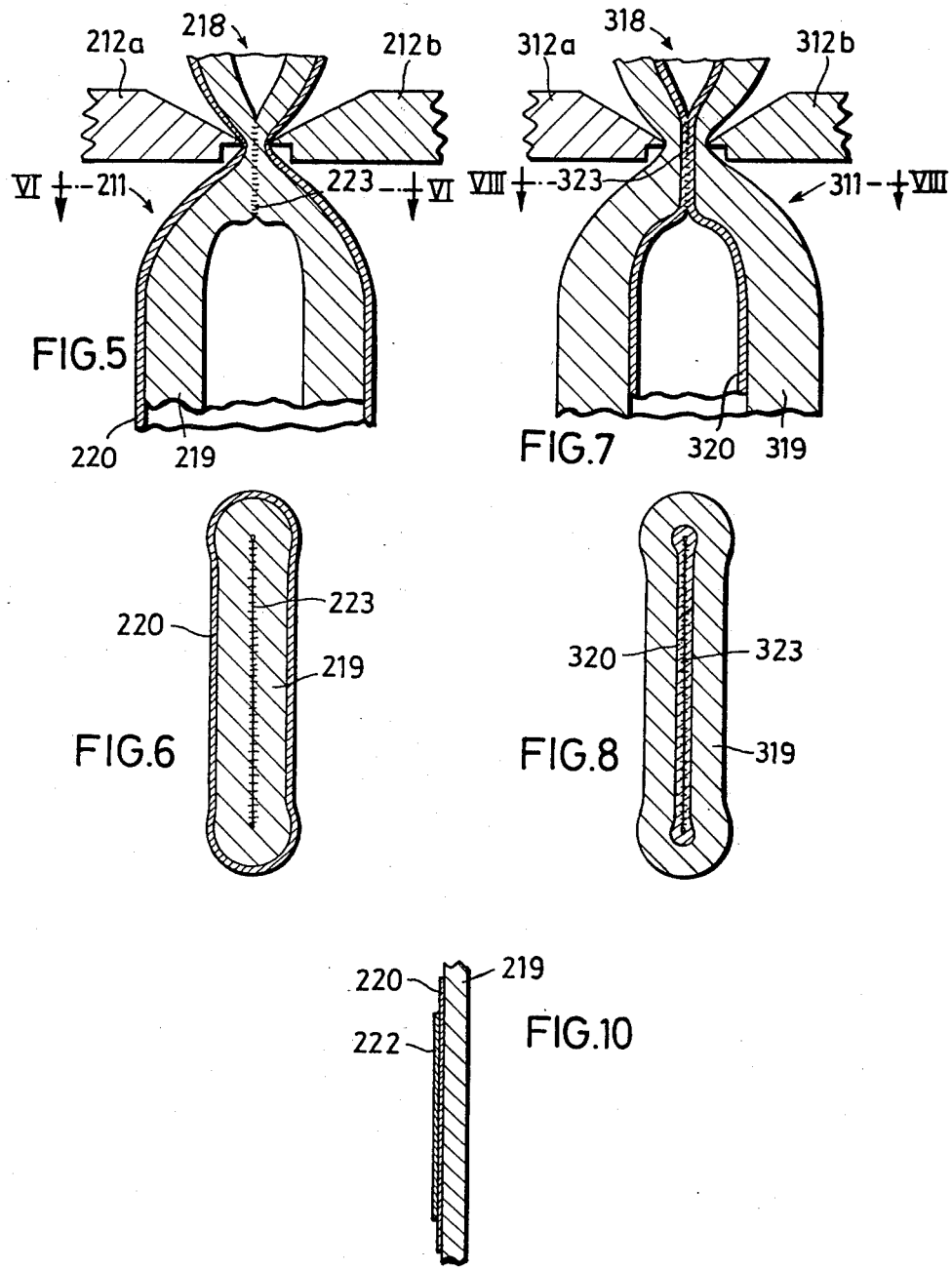

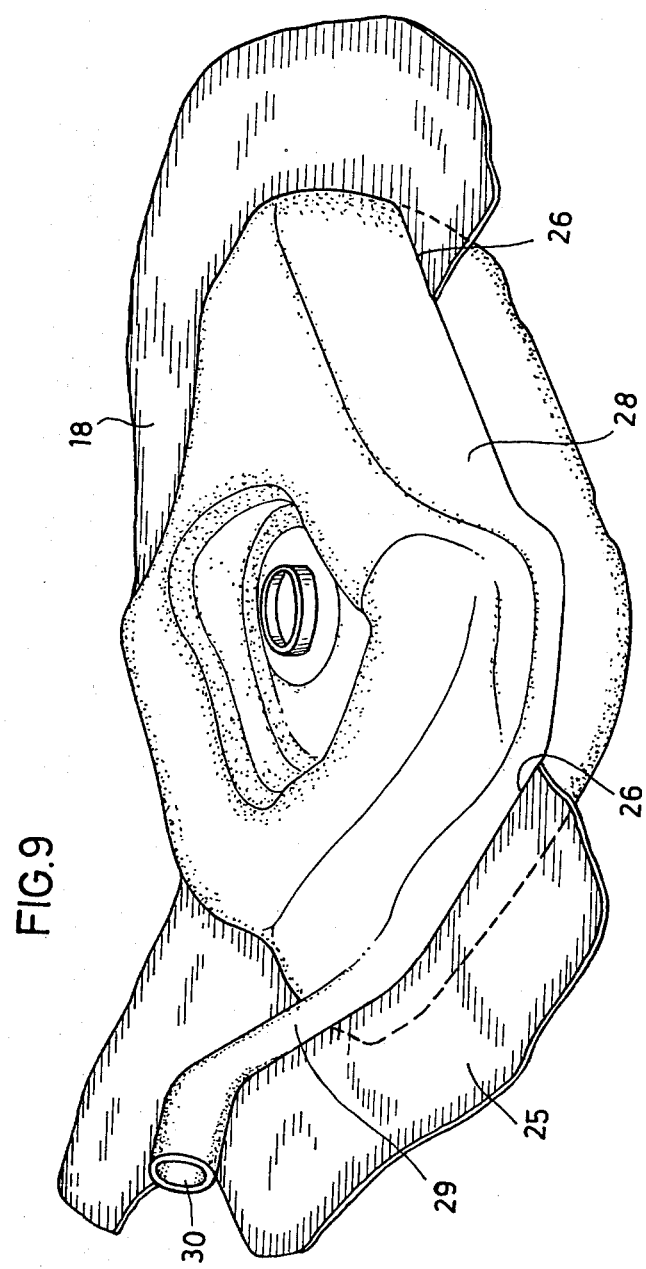

PROCESS FOR MANUFACTURE OF HOLLOW BODIES FROM SYNTHETIC MATERIALS

The invention concerns a process for the manufacture of hollow bodies which consist, at least primarily, of synthetic materials. The walls of the hollow bodies, or at least partial areas of these walls, have no less than three layers. At least one layer, serving as a carrier layer, is made of thermoplastic synthetic material, and at least one other layer is made of a material which serves to provide a means of adhesion between the carrier layer and at least one additional layer consisting of a material with characteristics different from those of the carrier layer. According to the invention, a preliminary form is first produced, which is then developed into the shape of the final product or a part thereof by utilizing a pressure differential.

BACKGROUND OF THE INVENTION

Hollow bodies of the above described nature are used for containing substances or for other purposes, in which the characteristics of commonly used synthetic materials, particularly polyolefins do not fulfill all requirements. As a typical example, the permeability of the polyolefins in respect to a contained substance and/or a surrounding medium may be mentioned. Thus, the permeability of these materials may be of significance when they are used in the production of fuel tanks.

Synthetic materials do exist, the permeability of which, e.g. for gasoline, is so low that it does not exceed the permissible values. However, these synthetic materials are expensive and/or not possible to process directly. In many cases, they also lack the mechanical characteristics of the polyolefins which are particularly suitable for fuel containers, specifically for tanks to be incorporated in motor vehicles, due to their solidity, toughness, elastic malleability, etc.

For the above described reasons, gasoline tanks in particular are manufactured so that a carrier layer, which consists mainly of a polyolefin, is provided with a barrier layer which is more or less impermeable to the contained substance, and the thickness of which is generally significantly less than that of the carrier layer. This barrier layer can be applied on the inside and/or the outside. Since, due to the different characteristics of the carrier layer material on the one hand and the barrier material on the other hand, it is generally impossible to bond these sufficiently well to each other, it has proven necessary to provide an additional layer of another material between the carrier layer and the barrier layer, the sole purpose of this additional layer being to provide a means of adhesion between carrier layer and barrier layer. Thus, this adhesive layer must consist of a material which forms a sufficiently stable bond with both the carrier material and the barrier layer material, whereby it is possible that the bond, e.g. between carrier layer and adhesive layer is achieved by means of heat-sealing, while the bond between the adhesive layer and the barrier layer is of an adhesive nature.

Under any circumstances consideration must be given to the strength of the bond between the adhesive layer and the barrier layer, since if the barrier layer is applied on the outside, the possibility does exist that the contained substance will diffuse through the carrier layer located on the inside and accumulate between the adhesive layer and the barrier layer, whereby the resulting gas pressure will affect the external barrier layer. Under the effect of this gas pressure, the barrier layer must be prevented from separating from the carrier layer or the adhesive layer. This can be achieved if the barrier layer is applied as an internal layer. However, for reasons that will be discussed later, this is extremely difficult if not impossible.

According to one procedure of the nature described at the outset, a multi-layer preliminary product is first extruded in the shape of a tube portion, which is then expanded to form a container according to the common method of subjecting it to internal pressure within a blow mold. The extrusion equipment required for the production of this preliminary product will necessarily have a very complicated structure, since it must be provided with at least three extruders—one for the material constituting the carrier layer, one for the material forming the adhesive layer, and one for the material that forms the barrier layer.

However, a more significant disadvantage is inherent in the fact that it is impossible or extremely difficult to re-use the waste material which cannot be avoided in the production process. This also applies to rejected portions which will be impossible to avoid in many, if not in most, manufacturing procedures. Such waste material will occur in the extrusion/blowing process, in any case, at the ends of the tube-shaped preliminary product. In the case of hollow bodies with a complicated shape, particularly for instance, fuel tanks to be built into vehicles, it is frequently impossible to avoid the occurrence of rejected parts, whatever the manufacturing procedure might be; the extent of waste portion per preliminary product may be up to 50% of the latter.

In the known extrusion/blowing procedure where the initial preliminary product is composed of three simultaneously extruded layers, the lack of re-usability of the waste material—which, in the case of gasoline tanks, will occur in greater than normal quantity—and the reject parts can be traced back to the fact that the parts consist of different materials, so that no uniform product will result from a reprocessing of this material. Admittedly, it is generally possible to mix and re-use the polyolefin constituting the carrier layer and the material forming the adhesive layer, since these materials are so similar that the existing differences would not be significant in the reprocessing. On the other hand, it must be assumed that the materials used for the barrier layer are so different in their chemical structure and physical properties from the polyolefins normally used for the carrier layer, that the two materials cannot be mixed with each other. In practice, this means that with the known procedure, the reject and waste portions cannot be re-used, or can be re-used only to a very limited extent, which will necessarily make the manufacturing significantly more expensive.

Another difficulty may be encountered in connection with the heat-sealed seams which are unavoidable in production of hollow bodies according to the extrusion/blowing procedure and which are formed on the preliminary product as a result of the squeezing off (flashing) process. When the hollow mold, which generally has two parts, is placed around the preliminary product, it is normally closed at one end, whereby simultaneously unnecessary material is squeezed off. Squeezing (flashing) processes of this type with simultaneous formation of a heat-seal seam may also occur in other areas of the preliminary product whenever necessary for adjusting it to the shape of the final product, i.e. the hollow body to be manufactured.

If the carrier layer, which generally consists of polyethylene or another polyolefin, is applied on the inside, there are generally no difficulties in producing a flawless heat-seal seam capable of resisting all occurring operational stresses, since the materials that can be used for the carrier layer possess the corresponding properties. Furthermore, the thickness of the carrier layer is ordinarily significantly greater than that of the other layers, so that the heat-seal seam of the carrier layer alone is sufficient to fulfill all practical requirements, regardless of whether or not the other layers are more or less involved in the formation of the heat-seal seam.

However, if the carrier layer is placed on the outside, the unavoidable consequence is that facing areas of the interior barrier layer are pressed against each other and must be heat-sealed to each other simultaneously while squeezing off the excess material. However, the barrier layer is generally so thin that it cannot form a sufficiently strong heat-seal seam, not even if the material has good heat-sealing properties. This applies for the adhesive layer as well. With this arrangement of the layers, the external carrier layer is insufficiently or not at all involved in the formation of the heat-seal seam, since the other two layers, i.e. the adhesive layer and the barrier layer, are located between the two facing carrier layer areas which are to be heat-sealed to each other, and since the barrier layer cannot form a good heat-seal bond with the material constituting the carrier layer, due to reasons cited at the outset.

In order to circumvent these difficulties, the suggestion has already been made to perform the co-extrusion of the generally tube-shaped preliminary product in such a manner that the adhesive layer and the barrier layer are extruded only over a predetermined portion of the length of the preliminary product, such that the end regions, where the flashing and heat-sealing processes are to be performed, would consist of the carrier layer only. This would make it possible to re-use that part of the excess material which consists of one material only. However, the equipment to accomplish a complete procedure is extremely complicated and consequently expensive as well as liable to malfunction. In addition, it is normally not possible to extrude the preliminary product with sufficient precision to assure that a specific section of the preliminary product, provided with adhesive layer and barrier layer, will be exactly positioned from one work cycle to the next within the hollow mold where it is to be blown into a hollow body. Furthermore, a procedure of this nature would not make it possible to re-use the waste flash portions from the sides of the preliminary product.

The purpose of the invention is to modify, particularly to simplify, a process of the nature described at the outset, so that the disadvantages of known processes will be avoided. Thus, the limitations in respect to re-use of excess and waste material should be eliminated or at least significantly decreased. Another objective is to avoid or to significantly reduce the difficulties involved in producing a heat-sealed seam that would be sufficient under all practical conditions, specifically in those areas where a connection between two facing areas of the same material or the resulting hollow body is to be accomplished simultaneously with the squeezing off of excess material. The equipment for carrying out the process should be simple, at least not more complicated and expensive than the equipment used for carrying out known processes. In respect to selection of the synthetic materials to be used for a specific function or layer, an optimum choice should be feasible.

SUMMARY OF THE INVENTION AND ITS ADVANTAGES

In order to solve this problem, the invention suggests that first, a preliminary product be shaped with at least two layers, of which at least one layer consists of a thermoplastic synthetic material and at least one layer of an adhesive material, resulting in an intermediate product corresponding to the shape of the finished product or a portion thereof, and that subsequently, at least one additional layer is applied in a special operation.

For instance, if a three-layer container or other hollow body is to be produced, a preliminary product with only two layers is produced according to this process, and is then further processed e.g. with a blow process. The preliminary product has only a carrier layer and an adhesive layer. Since it is possible, at least when polyolefins are used, for the carrier layer(s) to utilize a material for the adhesive layer which is chemically related to the polyolefin in question, recycle and re-use of any excess and waste portions after completion of the intermediate product presents no difficulties. Problems with heat-sealed seam can be avoided, since flawless heat-seal seams can be obtained without difficulty due to the chemical affinity between the two materials, even when the adhesive layer is positioned on the inside. Furthermore, considerable quantities of the material forming the additional layer can be saved, since this material can be applied to the complete hollow body, from which excess portions have already been removed.

An additional advantage is that it is possible, without difficulty, to apply the additional layer only to portions of the complete hollow body. Thus, for instance, the permeability of most materials considered for the carrier layer depends on the thickness of the wall or layer. In a vehicle tank there will be areas where the thickness of the carrier layer is great enough, for production reasons, to retain the permeability within admissible limits. This may be the case, for example, for the filling pipe which is frequently of significant length.

Further advantage of the procedure according to the invention is that the material for the additional layer, e.g. the barrier layer, can be selected without need to consider its capability of being processed in an extruder or its thermal stability. In known procedures, where the additional layer is co-extruded with the adhesive layer and the carrier layer, only such materials can be used which are suitable for extrusion and are capable of sustaining the consequent stresses, e.g. high temperatures, pressures, and strong shearing forces. This means that according to the invention no limitations have to be observed in the selection of materials usable for the additional layer in respect to their suitability for the manufacturing process. So, for instance, PVDC can be used in the form of a high molecular weight solution. This material cannot be extruded.

Furthermore, there is an additional advantage with a later application of the additional layer, namely that a uniformly thick additional layer can be applied, or—if necessary or advantageous—an additional layer with a variation in thickness in relation to the thickness of the other layers, for instance if the additional layer has the function of a barrier. Generally, it is advantageous, from a manufacturing point of view, to apply a uniformly thick layer. In any case, one problem is avoided with may occur in the expansion of a preliminary product which is already provided with an additional layer at the outset, namely that due to varying expansion conditions, the additional layer may not be evenly expanded, with the result in those areas where the stretching has been greatest, the additional layer of the finished product is thinnest. This means that with the known processes, the thickness of the additional layer must be selected with consideration of the area of least thickness after the stretching, the consequence of which is that in other areas of the hollow body, this layer is thicker than is necessary for its function, i.e. more material is applied than is necessary. Since, due to its intended specific function, the material of the additional layer is normally the most expensive material of all layers, the potential material saving specifically for this additional layer is an additional advantage of the process according to the invention.

Still further, the later application of the additional layer to the intermediate product has the advantage that in each case, the layer can be applied homogeneously and uniformly, i.e. without the interruption of heat-sealed seams, etc. In the case of hollow bodies manufactured according to the known processes described at the outset, where the preliminary product already has a layer of the additional material, i.e. normally three layers of which the outer one is the additional one, for instance the barrier layer, those areas of the barrier layer etc. located adjacent to the heat-seal seam might not be connected to each other so that eventually they separate from the layer below, a result that is also facilitated by the ocasionally somewhat curved profile of the heat-seal seam. This means that in this area, the additional layer can no longer fulfill its intended function.

Generally, a hollow body will consist of the above-mentioned three layers. However, it is also possible to produce it with more layers, for instance five. This arrangement might be such that the center layer is the carrier, on either side of which there is an adhesive layer and an additional layer. However, such a design would only be considered when, for instance, no permeability or very low permeability can be tolerated and when furthermore the material constituting the barrier layer is of such a nature that it can only be applied very thinly. This may also be dependent upon the procedure utilized for applying the additional layer on the intermediate product. A five-layer structure of the wall of the hollow body may also be considered when the carrier layer must be protected by an additional layer both in contact with the contained substance and in respect to the medium surrounding the hollow body, for example if the material forming the carrier layer would react chemically with the contained substance and the surrounding medium, or if it is influenced or changed in an undesirable manner by both media. Another function of the additional layer may be its electrical conductivity, for example to divert static charges.

The additional layer can be applied by molding, spraying, dipping, spreading on, or other suitable method. As a result, the thickness of this layer may be so minimal that although the material comprising it is not elastic or has a minimum degree of elasticity, it can nevertheless, due to its thinness, conform to possible elastic deformations to which the carrier and adhesive layers are subject. For the adhesive layer one may use, for example, a chlorinated polyolefin, which, on the one hand, forms a flawless and continuous heat-seal bond with the pololefin of the carrier layer and, on the other hand, also provides sufficient adhesion for the materials considered for the additional layer.

The invention is advantageously applicable to the extrusion/blowing process although not limited thereto. It is also possible to utilize it in an injection/blowing process. The same applies to a dipping/blowing process as well. Under certain circumstances it is also possible to produce the hollow body or portions thereof by means of deep-drawing and then to combine the individual parts into the final product. Thereby, the material constituting the additional layer may already be applied on the individual parts, if this is essential. In general, the process according to the invention is applicable under all conditions of manufacturing such multi-layer hollow bodies which consist of a synthetic material with characteristics which make it necessary to insulate this synthetic material from the contained substance and/or the surrounding medium by means of a layer of another material.

Procedures are also known for decreasing the permeability of synthetic materials by a special treatment, such as sulfonation and a treatment utilizing a fluorine-containing gas. Both procedures are costly and also have a strong environmental impact so that their extensive use is not possible without special precautionary measures.

It is also known how to flame surfaces of hollow bodies consisting of polyolefins in order to improve the adhesive characteristics of the surfaces treated in this manner. For instance, this treatment is generally used prior to printing on such hollow bodies, since the printing color would not otherwise adhere sufficiently well to the surface of the hollow body. However, in the production of large hollow bodies, e.g. tanks to be built into vehicles, this is difficult to do with the necessary precison, even on the exterior surfaces, since the equipment necessary to flame the entire external surface would be relatively complicated. It would be virtually impossible to flame the interior surface with sufficient precision, since the container openings, e.g. in the abovementioned tanks, are very small. Furthermore, it is questionable whether flaming alone would provide a stability of the bond between carrier and barrier layers that would suffice for all stresses occurring under practical conditions.

With the process according to the invention, the barrier layer can also be applied by means of a printing procedure, particularly a screen printing procedure. This is possible in the case of symmetrically shaped objects, e.g. bottles. In the case of hollow bodies with complicated shapes, e.g. vehicle tanks, this would apply to providing the additional layer at least for those areas of the surface where its shape and extension are such as to permit the use of a print procedure. The remaining areas would then be provided with the barrier layer forming material in a separate operation, if required.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

The drawings show embodiments for purposes for explaining the prior art in conjunction with an extrusion/blowing process, as well as additional embodiments for explanation of the invention, as follows:

FIG. 1 is a longitudinal section through a two-part hollow mold containing a three-layer, tube-shaped preliminary product according to the prior art;

FIG. 2 is a section along the line II—II in FIG. 1;

FIG. 3 is an illustration of a different embodiment of the prior art, but corresponding to the view shown in FIG. 1;

FIG. 4 is a section along the line IV—IV in FIG. 3;

FIG. 5 is an illustration of an embodiment according to the invention, corresponding to the form shown in FIG. 1;

FIG. 6 is a section along the line VI—VI in FIG. 5;

FIG. 7 is an illustration of a different embodiment according to the invention, corresponding to the form shown in FIG. 3;

FIG. 8 is a section along the line VIII—VIII of FIG. 7;

FIG. 9 is a perspective view of a vehicle tank;

FIG. 10 is a section through the wall of the completed tank of FIG. 9.

DETAILED DESCRIPTION OF THE PREFERRED EMBODIMENTS IN RELATION TO THE PRIOR ART

FIG. 1 shows a hollow mold of the type generally used in extrusion/blowing processes, for example in equipment according to German published patent application No. 24 23 503 or U.S. Pat. No. 3,989,437.

A tube-shaped preliminary product 11, obtained by means of extrusion equipment (not shown) is accomodated in a two-part hollow mold 12, the two halves of which 12a and 12b are shown in a position shortly before closing of the mold, where the two halves of the mold are at the smallest distance from each other. The two mold halves 12a and 12b are provided with shearing edges 14a and 14b, which, during the closing movement of the two mold parts, first flatten the tube-shaped preliminary product 11 and then press the facing areas 16a and 16b against each other with simultaneous formation of a heat-seal bond. The shearing edges 14a and 14b simultaneously or shortly thereafter squeeze off a waste portion, such as area 18 of the preliminary product, which remains outside of the mold nest 17. Normally, this waste portion remains connected to the hollow body located inside the mold nest 17 via a thin film of the material. After removing the expanded hollow body from the mold, the waste portion 18 and other portions, if any, will be cut off. The above-described relationships are generally well known in the extrusion/blowing art.

In the embodiment illustrated in the FIGS. 1 and 2, the preliminary product 11 consists of three layers: the carrier layer 19, the adhesive layer 20, and the barrier layer 22. These are arranged so that the carrier layer 19 of the coaxially extruded layers is positioned on the inside. This carrier layer is significantly thicker than the two other layers. It determines the mechanical characteristics of the hollow body to be produced. The quality of the latter is mainly dependent on the quality of the heat-seal seam which is created during the closing of the preliminary product 11 in area 23. FIGS. 1 and 2 clearly illustrate that the quality of the heat-seal seam is mainly determined by the characteristics, particularly the thickness, of the material constituting the carrier layer 19, since this layer is positioned in the interior and thus, when the two facing areas 16a and 16b are connected, it is the areas of the carrier layer 19 which are heat-sealed to each other. In this regard the two other layers 20 and 22 are practically insignificant or of only minor importance, particularly since, due to their thinness, they do not contribute much to the strength of the resulting hollow body nor, consequently, to the stability of the heat-seal seam.

With the layers 19, 20, and 22 arranged according to FIGS. 1 and 2, there are generally no problems in respect to the quality of the heat-seal seam 23. On the other hand, positioning the barrier layer 22 at the outside of the preliminary product 11 and, consequently, of the resulting hollow body, may lead to considerable disadvantages, which would indicate that it is more advantageous to position the barrier layer on the inside. This is the case in the embodiment shown in FIGS. 3 and 4, in which the parts corresponding to those in FIGS. 1 and 2 are indicated with identical numbers but preceded by 1. When the two facing areas 116a and 116b of the tube-shaped preliminary product 111 are pressed against each other, the corresponding areas 122a and 122b of the barrier layer 122 touch each other on the inside. Provided that the material forming the barrier material can be heat sealed, heat-seal bond 123 will be created. However, due to the minimal thickness of the barrier layer 122, the bond 123 does not have the necessary stability, so that the heat sealed area necessarily becomes a weak point in the finished hollow body. Due to the fact that the material of the—sufficiently thick—carrier layer 119, on the one hand, and, on the other hand, the material of the barrier layer 122 cannot bond to each other, or can do so only to a limited extent due to their different characteristics, the material of the carrier layer 119 contributes little to the formation of a heat-seal seam or to the stability of the same. This means that the advantage of having an interior barrier layer is acquired at the cost of disadvantages which are so great that in many cases, this form of construction will not be possible to realize under practical conditions.

The two known forms of construction described above also have another disadvantage in common, namely that the waste portions 18 and 118 consist of three different materials, which normally cannot be processed and re-used together. In FIG. 9, the illustrated gasoline tank still retains the waste portions 18 and 25, which are still connected to the actual tank 28 via the previously mentioned films or bridges 26 and could normally be removed by simple tearing. The waste portion 18 is located at that end of the tank which corresponds to the end at which the preliminary product, as shown in FIGS. 1 and 3, is to be closed. At the other end of the tank is the intake feed-pipe 29 with the fill opening 30. The waste portion 25 at this end of the tank is also very large. In the embodiment shown in FIG. 9, a typical gasoline tank, the proportion of waste material amounts to approximately 70%. This means that the re-usability of this waste portion under certain conditions could provide a decisive answer to the question of whether or not such a tank can be economically justifiable.

In the embodiment of the invention according to FIGS. 5 and 6, the extruded preliminary product 211 consists of merely two layers: the carrier layer 219 which is significantly thicker in this case as well, and an external adhesive layer 220. The heat-seal seam 223 thus has all characteristics necessary with respect to stability, tightness, ect. for the production of a flawless hollow body. The resulting waste portion 218—and naturally also other waste portions located at other parts of the preliminary product 211—consist of only two material components, namely the material of the carrier layer 219 and that of the adhesive layer 220, which can normally be so selected that the existing differences do not prevent a common re-use and recycling of the waste portion. This means that a mixture of the two components in the recycling will result in a material with such minor differences in character, as compared to the carrier layer 219, that it can be re-used as carrier layer material without difficulty.

Naturally, there will be produced in the hollow mold 212a and 212b a hollow body which at first consists only of the two material layers 219 and 220. This hollow body, which represents an intermediate product in the total manufacturing process, will then be subjected to one or more additional operations, during which it will be provided with the barrier layer, which in this case is positioned on the outside, since the adhesive layer 220 is applied to the outside of the carrier layer.

In the embodiment of the invention according to FIGS. 7 and 8, the carrier layer 319 is applied to the outside, so that the adhesive layer 320 is located on the inside. When the facing portions of the preliminary product 311 are pressed together and against each other, the opening areas of the adhesive layer 320 are brought into contact with each other. In spite of the limited thickness of the adhesive layer 320, the resulting heat-seal seam 323 will nevertheless have sufficient stability, since, due to the good bond between the adhesive layer and carrier layer 319, the latter fully participates in the heat sealing and thus contributes to its stability. The remarks made in connection with the embodiment according to FIGS. 5 and 6 apply as well to the waste portion 318 and any additional waste portions. In this case, the barrier layer will be applied later on the inside. This may be done, for instance, by spraying or by rinsing with a suitable substance.

FIG. 9 shows the finished hollow body, the walls of which consist of three layers, 219, 220, and 222 as shown in FIG. 10. Layer 222 has been applied later in a separate operation. In the embodiment according to FIG. 9, the barrier layer 222 is located on the outside. In the other case, i.e. the embodiment according to FIGS. 7 and 8, the barrier layer would be located on the inside. It is also possible to provide the carrier layer 219 with a barrier layer both on the inside and on the outside.

The fact that an additional operation is required for the application of the material forming the barrier layer does not constitute any significant disadvantage. The additional cost for equipment or mechanisms for application of the barrier layer is more than offset by the more simple construction of the extrusion equipment. Furthermore, the elimination of limitations with respect to the selection of material for the barrier layer is to be considered, since for each case the material can be used which, under the given conditions, is optional with respect to the desired technical effect and economy. Also, with respect to the thickness of the barrier layer, it will be unnecessary to consider any limitations based on the manufacturing procedure and the equipment utilized in the manufacturing procedure.

The present invention may be embodied in other specific forms without departing from the spirit or essential attributes thereof and, accordingly, reference should be made to the appended claims, rather than to the foregoing specification, as indicating the scope of the invention.

I claim:

1. A process for manufacturing a hollow body for containing a substance, said body comprising at least principally synthetic plastic materials, at least portions of the walls of said body comprising at least three layers of different plastic materials including a synthetic thermoplastic carrier layer, a bonding layer on at least one side of said carrier layer, and at least one barrier layer bonded to said carrier layer by said bonding layer, said barrier layer comprising a material with characteristics differing from those of said carrier layer the extent that a mixture of said material with those materials of said carrier layer and said bonding layer cannot be re-used or can be re-used only to a very limited extent, said process including initially forming a premolded form and subsequently shaping said form into at least a portion of a finished product by means of pressure differential, characterized by simultaneously producing said form by co-extrusion with at least a carrier layer and a bonding layer but without a barrier layer, said carrier layer and bonding layer comprising materials which are chemically related so as to allow recycle and re-use of waste portions, shaping said form by blow molding into a finished or intermediate product with accompanying formation of waste portions for recycle and re-use, and subsequently applying at least one said barrier layer to at least a section of said product in a separate operation after said shaping.

2. A process according to claim 1 characterized in that the barrier layer material is not changed in its physical and/or chemical characteristics by the substance to be contained by and/or the medium which will surround said hollow body.

3. A process according to claim 1 characterized in that the barrier layer material is not to any significant degree permeable to the substance to be contained by or the medium to surround said hollow body.

4. A process according to claim 1, 2 or 3, characterized in that the barrier layer material possesses a certain electrical conductivity.

5. A process according to claim 1, 2 or 3, characterized in that the barrier layer is applied only to partial areas of said form with at least two layers in its walls.

6. A process according to claim 1, 2 or 3, characterized in that the bonding layer is applied on the outside of said carrier layer.

7. A process according to claim 1, 2 or 3, characterized in that the bonding layer is applied on the inside of said carrier layer.

8. A process according to claim 1, 2 or 3, characterized in that the barrier layer is applied by means of molding, spraying, dipping or spreading on.

9. A process according to claim 1, 2 or 3, characterized in that the synthetic thermoplastic used for the carrier layer is polyethylene or another polyolefin.

10. A process according to claim 1, 2 or 3 characterized in that a chlorinated polyolefin is used for the bonding layer.

11. A process according to claim 1, 2 or 3, characterized in that polyvinylidene chloride is used for the barrier layer.

12. A process according to claim 11 wherein said polyvinylidene chloride is applied in the form of a high molecular weight solution.

13. A process according to claim 1, 2 or 3, characterized in that two-component lacquer systems of polyisocyanate with polyesters containing OH groups or with alkyd resins are used for the barrier layer.

14. A process according to claim 1, 2 or 3, characterized in that the intermediate product comprises several parts and the barrier layer is applied prior to the assembly of the parts into the finished product.

* * * * *